(12) United States Patent
Bruno et al.

(10) Patent No.: US 10,634,065 B2
(45) Date of Patent: Apr. 28, 2020

(54) ENGINE BLEED AIR SYSTEM

(71) Applicant: Hamilton Sundstrand, Windsor Locks, CT (US)

(72) Inventors: Louis J. Bruno, Ellington, CT (US); Gregory L. DeFrancesco, Simsbury, CT (US); Thomas M. Zywiak, Suffield, CT (US); Diane G. Drew, Windsor, CT (US); Harold W. Hipsky, Willington, CT (US); Daniel L. Hughes, Templeton, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 230 days.

(21) Appl. No.: 14/501,390

(22) Filed: Sep. 30, 2014

(65) Prior Publication Data

US 2016/0090917 A1 Mar. 31, 2016

(51) Int. Cl.
*F02C 9/18* (2006.01)
*F02C 6/08* (2006.01)
*B64D 13/06* (2006.01)
*F02C 6/12* (2006.01)

(52) U.S. Cl.
CPC .............. *F02C 9/18* (2013.01); *B64D 13/06* (2013.01); *F02C 6/08* (2013.01); *F02C 6/12* (2013.01); *B64D 2013/0618* (2013.01); *B64D 2013/0648* (2013.01); *F05D 2220/62* (2013.01);
(Continued)

(58) Field of Classification Search
CPC ........ B64D 13/02; B64D 13/04; B64D 13/06; F02C 6/08
See application file for complete search history.

(56) References Cited

U.S. PATENT DOCUMENTS

| 5,373,707 A * | 12/1994 | Ostersetzer ............ B64D 13/06 62/401 |
| 2010/0107594 A1 | 5/2010 | Coffinberry et al. |
| 2012/0186267 A1 | 7/2012 | Coffinberry et al. |

(Continued)

FOREIGN PATENT DOCUMENTS

| JP | 2002002596 A | 1/2002 |
| WO | 2014093279 A1 | 6/2014 |

OTHER PUBLICATIONS

Extended European Search Report; Application No. 15187401.3-1607; dated Feb. 25, 2016; 9 pages.
(Continued)

*Primary Examiner* — Woody A Lee, Jr.
*Assistant Examiner* — Michael L Sehn
(74) *Attorney, Agent, or Firm* — Cantor Colburn LLP

(57) ABSTRACT

An engine bleed air system having one or more taps in the compressor section of an aircraft engine, for example a low pressure tap and a high pressure tap. The low pressure tap is fluidly connected to the compressor of a turbo-compressor and the high pressure tap is fluidly connected to the turbine of the turbo-compressor. A bypass line connects the high pressure air to the outlet of the compressor, with a heat exchanger used to remove excess heat from the bypass line. An additional heat exchanger is used to remove any excess heat from the compressed air, dumping the heat to a fan stream or to the expanded air exiting the turbine. The system is controlled to minimize the amount of high pressure air extracted from the engine.

10 Claims, 6 Drawing Sheets

(52) U.S. Cl.
CPC .. *F05D 2260/213* (2013.01); *F05D 2260/606* (2013.01); *Y02T 50/56* (2013.01); *Y02T 50/675* (2013.01)

(56) References Cited

U.S. PATENT DOCUMENTS

| | | |
|---|---|---|
| 2013/0174573 A1 | 7/2013 | Hipsky et al. |
| 2013/0187007 A1 | 7/2013 | Mackin et al. |
| 2013/0269374 A1* | 10/2013 | Kelnhofer ............... B64D 13/06 62/89 |
| 2014/0165588 A1* | 6/2014 | Snape ...................... F02C 9/18 60/782 |
| 2014/0250898 A1 | 9/2014 | Mackin et al. |

OTHER PUBLICATIONS

EP Communication Pursuant to Article 94(3) EPC; Application No. 15 187 401.3-1607; dated May 18, 2017, pp. 1-7.
Communication pursuant to Article 94(3) EPC issued in EP Application No. 15187401.3 dated May 14, 2018, 7 pages.

\* cited by examiner

ENGINE BLEED AIR SYSTEM

BACKGROUND

This application relates to an environmental control system for an aircraft which extracts both high and low pressure compressed air for uses on an aircraft.

Commercial aircrafts or jetliners typically employ an environmental control system to pressurize a passenger cabin of the aircraft and/or thermal anti-icing systems to provide heated air for anti-icing applications. Air supply to these systems is typically provided by bleed air extracted from or provided by a compressor of an aircraft engine. To meet pressure and/or temperature demands of the various aircraft systems, bleed air is often extracted from a high stage of a low-pressure compressor of the aircraft engine. For example, bleed air is often extracted from an eighth stage compressor of an aircraft engine. The pressurized bleed air is then often cooled via a precooler prior to providing the bleed air to a system of the aircraft (e.g., environmental control system). Thus, a portion of the energy spent by the engine to produce the bleed air is wasted when cooling the bleed air via the precooler. As a result, high-pressure bleed air extracted from the compressor may significantly reduce the efficiency of the engine.

To reduce extraction of bleed air, some known systems employ a turbo-compressor that receives ambient air from an atmospheric inlet. The turbo-compressor pressurizes the ambient air prior to supplying the various aircraft systems. However, the atmospheric inlet produces drag. Additionally, the atmospheric inlet is often susceptible to icing and, thus, requires an anti-icing system that increases costs and system complexity. Further, the compressor may have to be relatively large to produce a pressure change sufficient to power the systems of an aircraft.

SUMMARY OF THE INVENTION

Disclosed herein is an engine bleed air system for an aircraft having one or more taps for extracting air from the compressor section of an engine. The system also includes a turbo-compressor having a compressor and a turbine. An environmental control system is fluidly connected to an outlet of the compressor by a delivery line. A bypass line is fluidly connected to at least one of the one or more taps and to the delivery line. A bypass heat exchanger is arranged to remove heat from the bypass line.

Another aspect of the disclosure provides an engine bleed air system for an aircraft having a plurality of taps for extracting air from the compressor section of an engine. The plurality of taps include a low pressure tap and a high pressure tap. The low pressure tap is fluidly connected to an inlet of a compressor on a turbo-compressor. The high pressure tap is fluidly connected to an inlet of a turbine of the turbo-compressor. An environmental control system is fluidly connected to an outlet of the compressor by a delivery line. A balancing heat exchanger is arranged to remove heat from the delivery line.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed system are presented herein by way of exemplification and not limitation with reference to the Figures. It is to be understood that other embodiments may be utilized and changes may be made without departing from the scope of the present disclosure.

Figure 1:
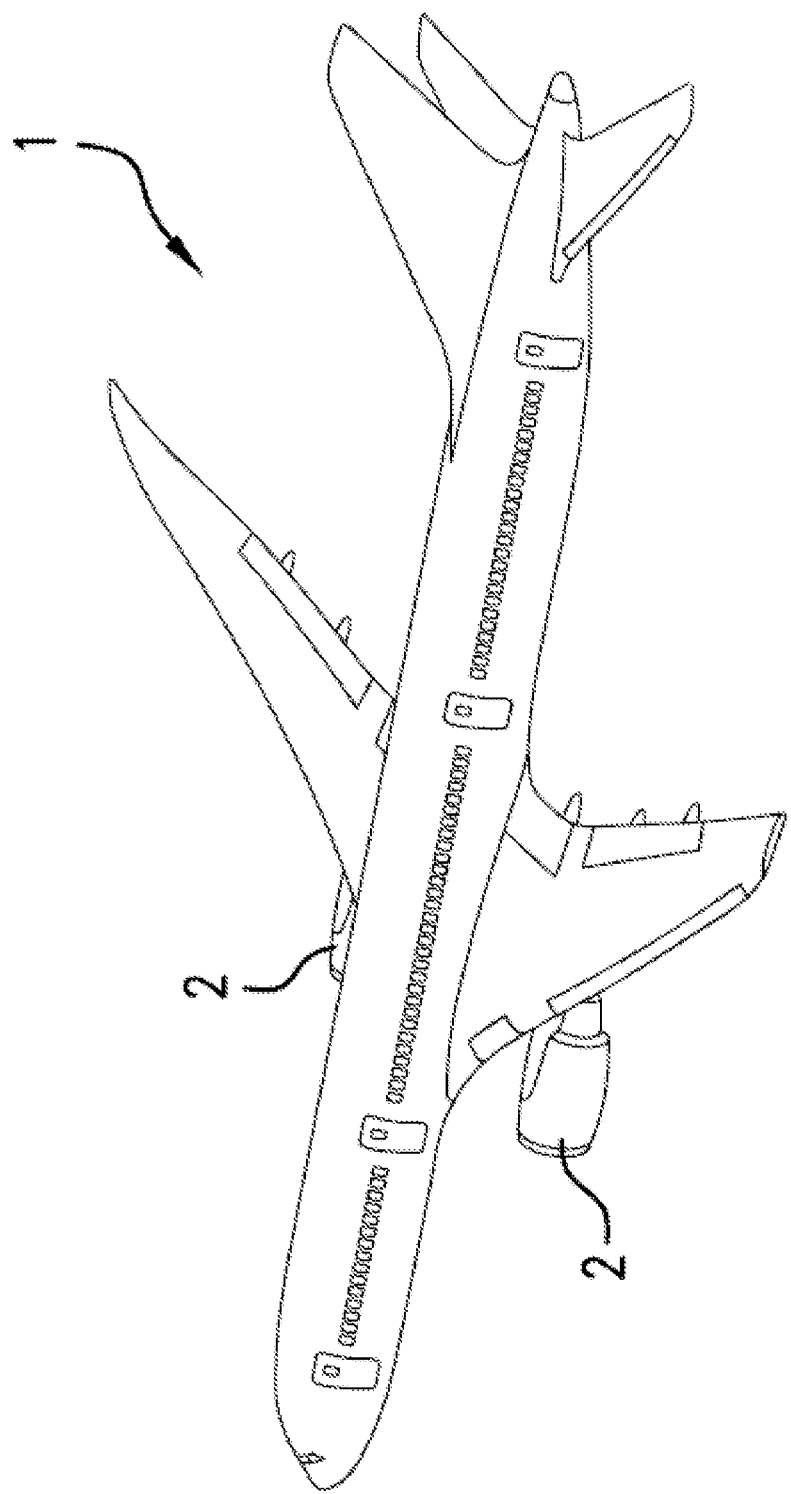
FIG. 1 is an aircraft employing one embodiment.
Figure 2:
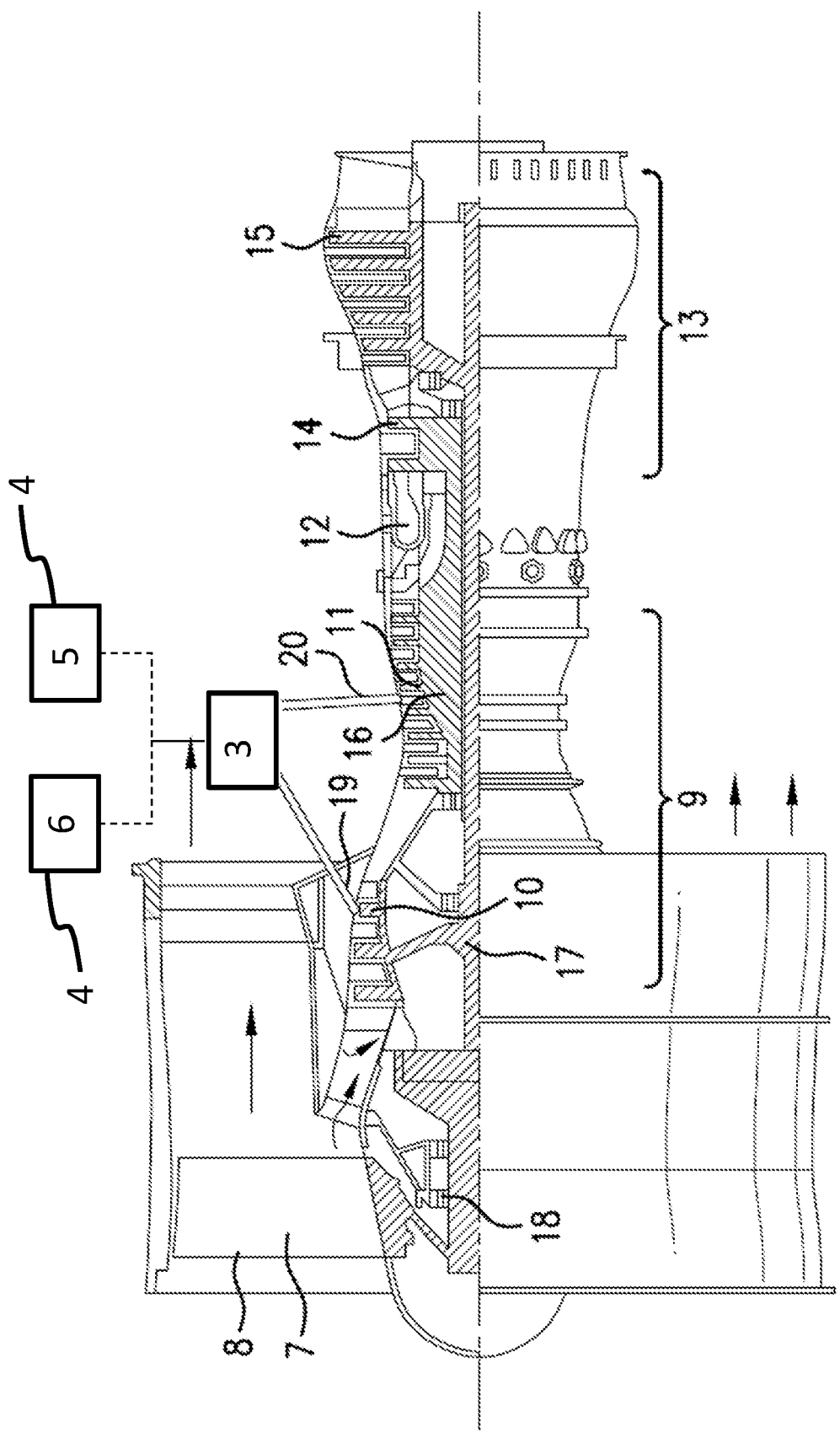
FIG. 2 is a schematic of a gas turbine engine according to one embodiment.

FIG. 1 illustrates an example commercial aircraft 1 having aircraft engines 2 (e.g., turbofan engines) that may embody aspects of the teachings of this disclosure. FIG. 2 is a sectional view of the example aircraft engine 2 of FIG. 1. Each engine 2 of the aircraft 1 may employ a dedicated bleed air system 3 and/or may employ a common bleed air system 3. The bleed air system 3 of FIG. 3 provides compressed or pressurized air to an aircraft system 4 such as, for example, an environmental control system 5 (ECS), a thermal anti-icing system 6 (e.g., an engine and/or wing anti-icing system), etc.

Turning in detail to FIG. 2, the example engine 2 includes a fan 7 (having a plurality of fan blades 8), a compressor section 9 (which includes both a low pressure compressor 10 and a high pressure compressor 11), a combustor 12, and a turbine section 13 (which includes both a high pressure turbine 14 and a low pressure turbine 15). The high pressure compressor 11 is driven, via a first spool 16, by the high pressure turbine 14. The low pressure compressor 10 is driven, via a second spool 17, by the low pressure turbine 15. Also driven by the low pressure turbine 15 are the fan blades 8 of the fan 7, which fan is coupled to the second spool 17 via a gear 18.

FIG. 2 also shows exemplary features of the bleed air system 3 in relation to an engine 2 of the aircraft 1. In particular, the engine bleed air system 3 includes one or more taps to extract air at various stages of the engine 2. In the example illustrated in FIG. 2, the engine bleed air system includes a low pressure tap 19, shown in the low pressure compressor 10, and a high pressure tap 20, shown in the high pressure compressor 11. In other examples, the low pressure tap 19 and the high pressure tap 20 may both be within the stages of the high pressure compressor 11 or the low pressure compressor. The indication of "low pressure" and "high pressure" with respect to the taps 19, 20 is therefore a relative term indicating that the high pressure tap 20 is at a location of higher pressure than the location of the low pressure tap 19.

Figure 3:
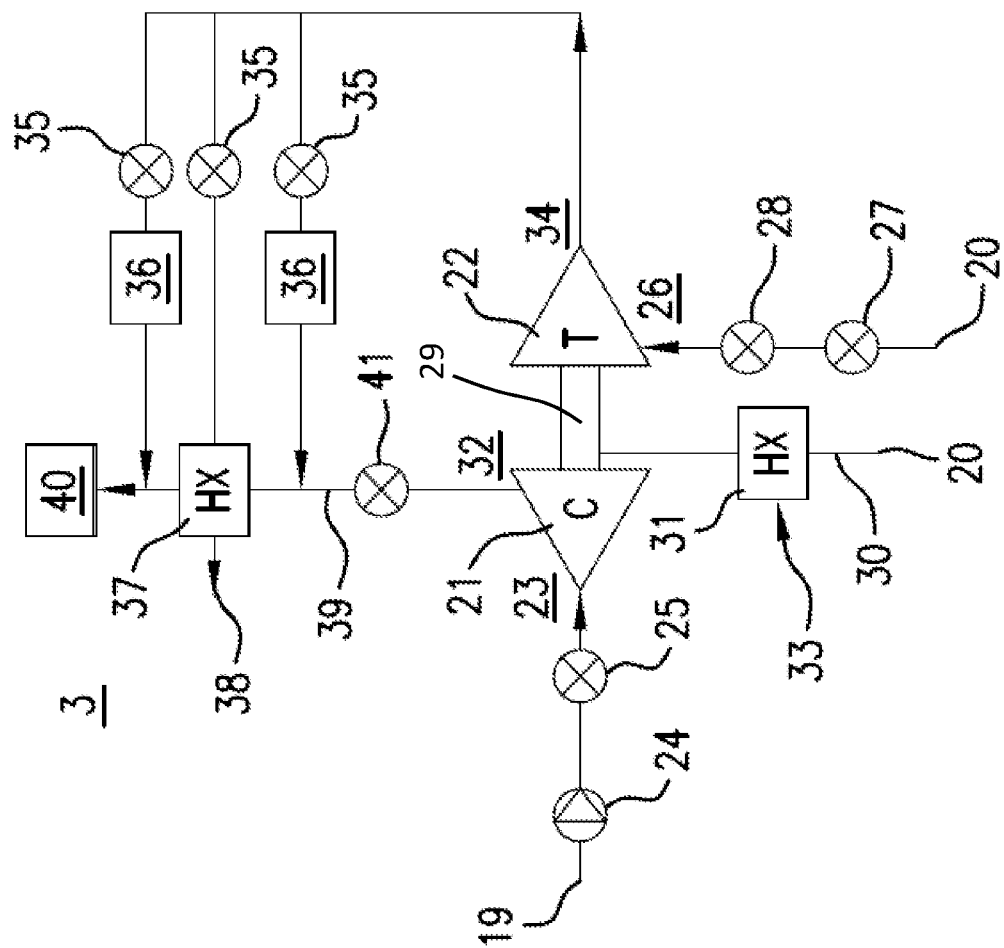
FIG. 3 is a schematic of a bleed air system according to one embodiment.

FIG. 3 illustrates the features of the bleed air system 3 according to one example of the present disclosure. As shown, the engine bleed air system 3 employs a turbo-compressor having a compressor 21 and a turbine 22. The low pressure tap 19 is fluidly connected with the compressor inlet 23. A low pressure check valve 24 ensures that the air flows in the direction of the compressor inlet 23. A compressor shut off valve 25 is also located upstream of the compressor inlet. The low pressure shut off valve 25 can be located on either side of the low pressure check valve 24. The high pressure tap 20 is fluidly connected to the turbine inlet 26. The flow of high pressure air is controlled by a turbine shut off valve 27 and a turbo-compressor control valve 28. The energy created by the expansion of high pressure air in the turbine 22 drives the compressor 21 by virtue of a turbo-compressor shaft 29.

The high pressure tap 20 is also fluidly connected to a bypass line 30 having a bypass heat exchanger 31. The bypass line 30 delivers the high pressure air to the compressor outlet 32, for example, when the engine is running at lower pressures and the air extracted through the high pressure tap 20 is at a useful pressure. The bypass heat exchanger 31 may transfer the excess heat from the bypass line 30 to, for example, fan stream 33. Fan stream 33 may comprise air drawn in through the fan 7 or ambient air.

Air expands through the turbine 22 and exits through the turbine outlet 34. The turbine outlet 34 travels to one of a plurality of destinations, as controlled by service valves 35. For example, the turbine outlet 34 is fluidly connected by the valves to one or more services 36 and/or sent through a balancing heat exchanger 37 and discharged to overboard 38. The services 36 may be, for example, an anti-icing system, a pneumatic supply system, and/or any other system of the aircraft that requires use of compressed air.

Air compressed by the compressor exits into compressor outlet 32. Compressor outlet 32, which may include air from the bypass line 30, is fluidly connected to delivery line 39, which is used to deliver the compressed air to an environmental control system 40. Delivery line 39 may contain a bleed shut off valve 41. Delivery line 39 is also shown passing through balancing heat exchanger 37, which is used advantageously to cool the air in delivery line 39 when necessary to meet the requirements of the environmental control system 40. In addition, the compressed air in delivery line 39 may be mixed with air from the turbine outlet that may have been used by services 36. This mixing may take place upstream or downstream from the heat exchanger 37, as the situation may require.

Figure 4:
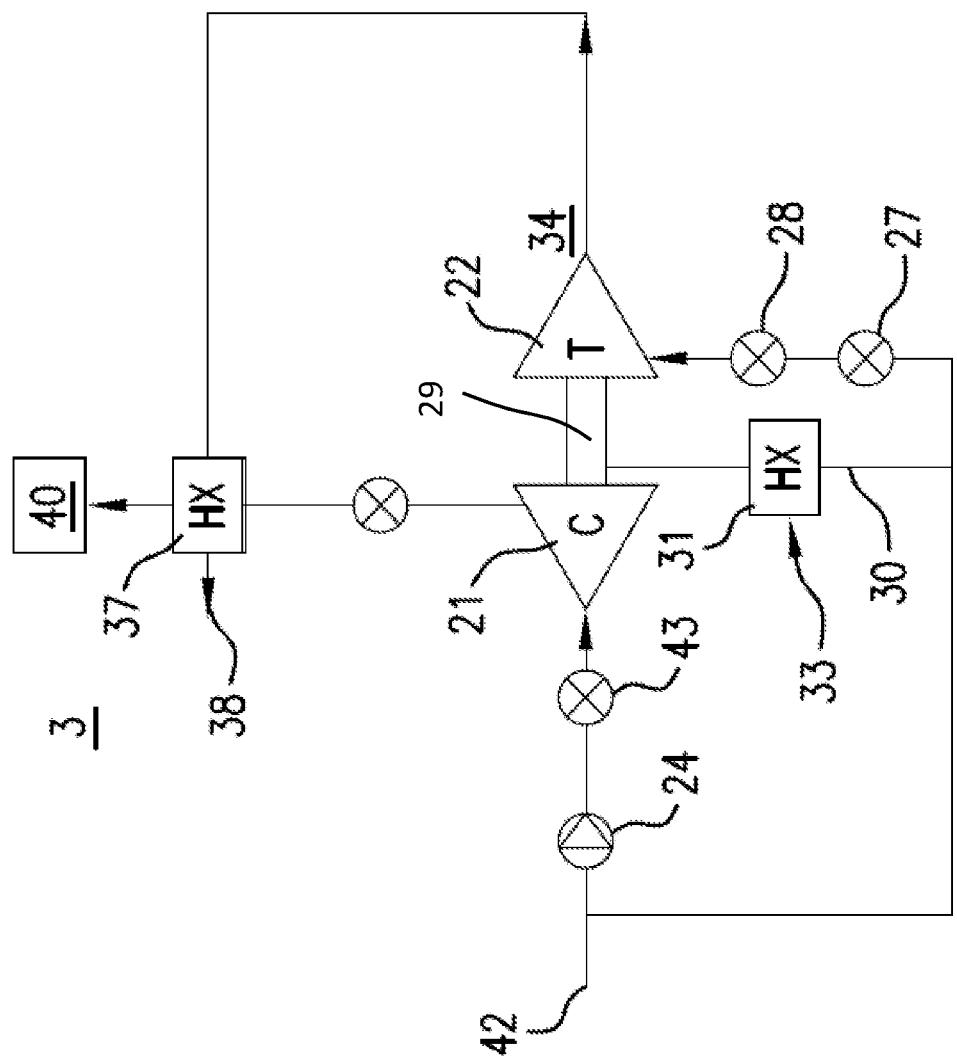
FIG. 4 is a schematic of a bleed air system according to another embodiment.

FIG. 4 illustrates another example of the engine bleed air system 3 according to the present disclosure. In the example of FIG. 4, the engine bleed air system 3 receives intermediate stage air 42 from one or more taps. For example, the intermediate stage air may be air from the low pressure tap 19 or from a mixture of air from the low pressure tap 19 and the high pressure tap 20. Depending on the pressure of the intermediate stage air 42, the air can be routed through the heat exchanger 31 or into the compressor 21 and/or the turbine 22. The air to the compressor inlet 23 is controlled by compressor control valve 43.

Figure 5:
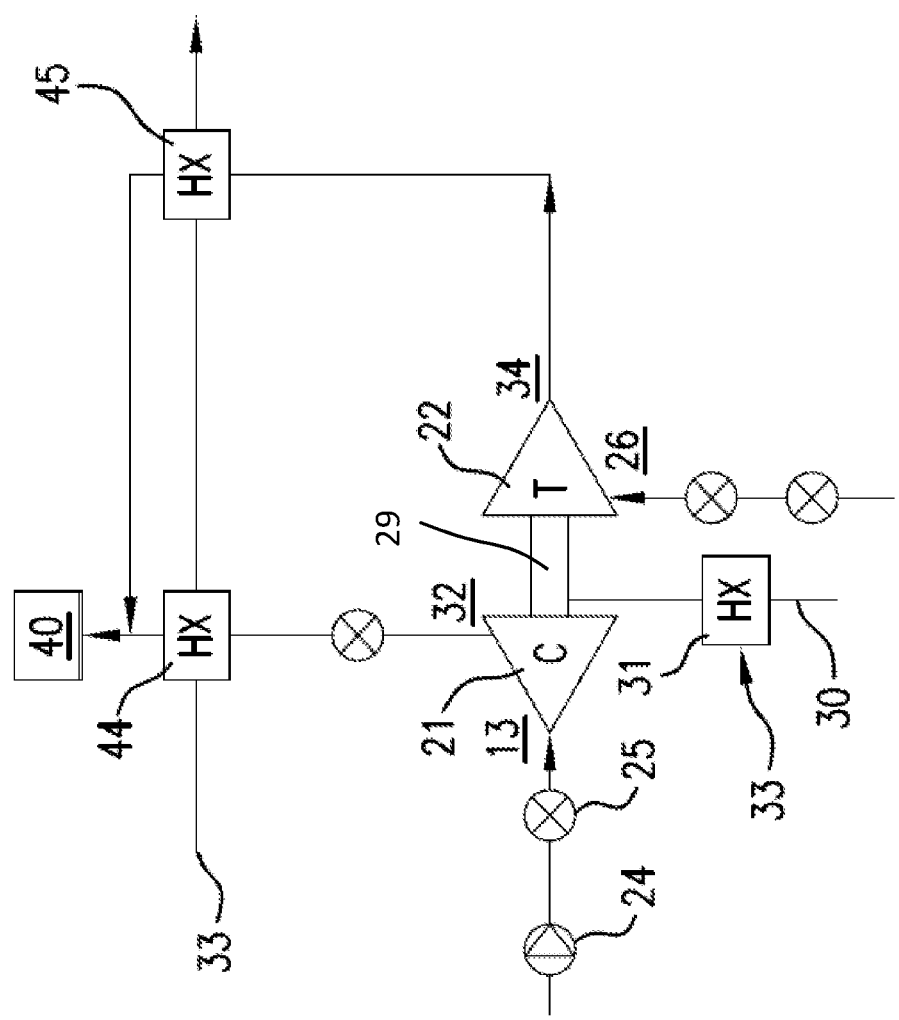
FIG. 5 is a schematic of a bleed air system according to another embodiment.

FIG. 5 illustrates another example of the engine bleed air system 3 according to the present disclosure, wherein the air from the compressor outlet 32 is sent through a compressor outlet heat exchanger 44, where the air is cooled by the fan stream 33. The air in the turbine outlet 34 is also cooled by the fan stream 33 at a turbine outlet heat exchanger 45. The air in the turbine outlet 34 may also be used in connection with services 36 and/or combined with the compressor outlet 32 prior to delivery to the environmental control system 40.

FIG. 5 shows the fan stream 33 passing first through the compressed air heat exchanger 44 and second through the turbine air heat exchanger. In the alternative, the fan stream 33 may be connected to the heat exchangers 31, 44, 45 in any order or in parallel.

In operation, the engine bleed air system described above receives relatively lower pressure air from the engine (aggregate of the low pressure tap and the high pressure tap) than conventional bleed air systems. By extracting air from the engine at lower pressures, less energy is drawn from the engine for the needs of the bleed air system. Extracting air having relatively less energy necessarily leads to less wasted energy, thereby enhancing the fuel efficiency of the engine.

The increase in fuel efficiency that is available from the embodiments disclosed herein is at least partially dependent upon a control scheme that incorporates temperature and pressure readings at various points in the system, including the engine and the environmental control system.

Figure 6:
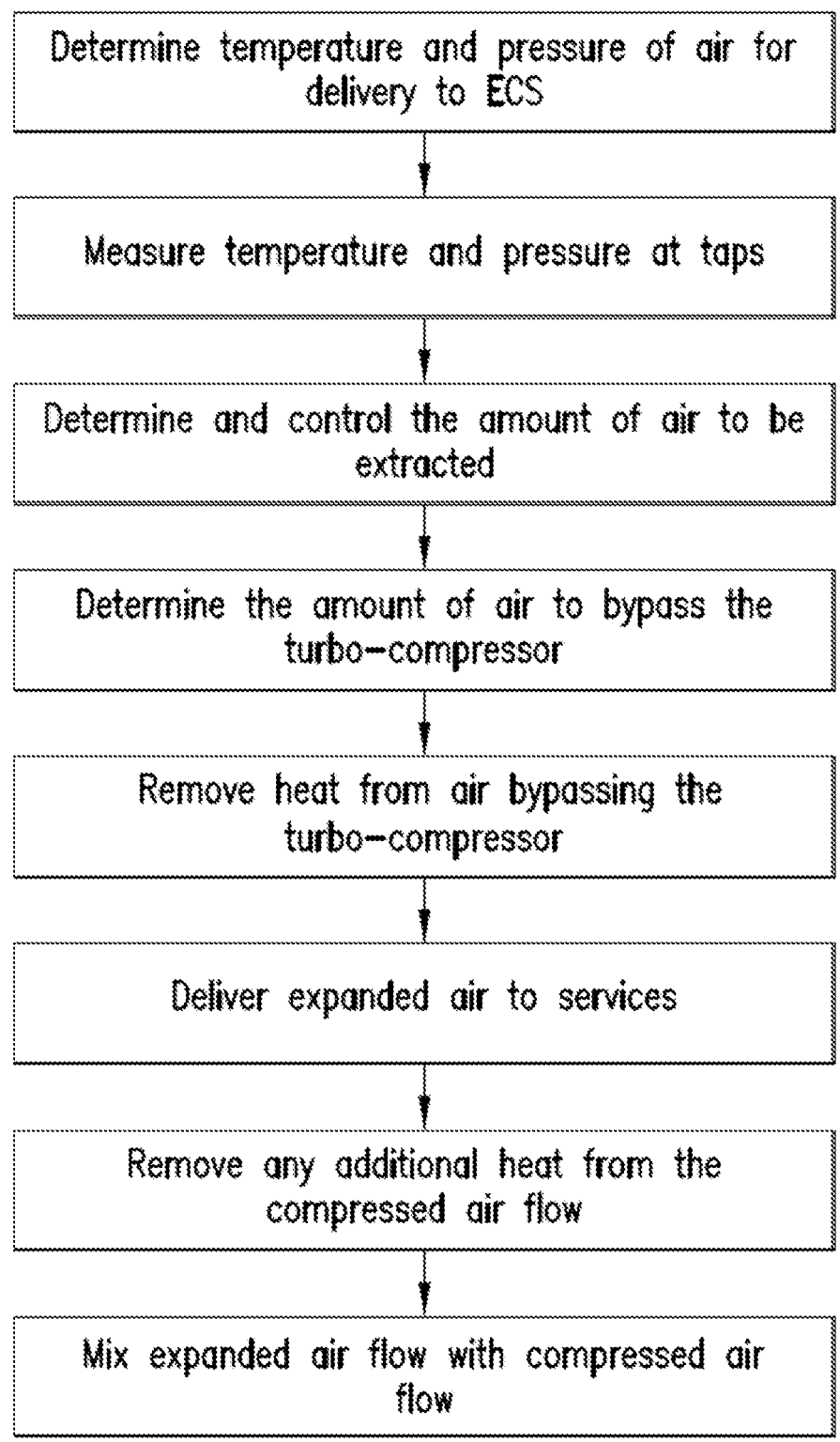
FIG. 6 is a flowchart of a method of operating a bleed air system according to another embodiment.

FIG. 6 shows a basic flowchart for a method of operating an engine bleed air system on an aircraft. The method includes determining the appropriate temperature and pressure required for air delivered to the environmental control system (ECS). Instrumentation is used to measure temperature and pressure at the locations of the low and high pressure taps in the compressor section of the engine. Using these measurements, the amount of air to be extracted at the high pressure tap and/or at the low pressure tap is determined and controlled, with the low pressure air sent to the compressor of the turbo-compressor. These controls are implemented using the shut off valves and control valves discussed above. Also, the amount of high pressure air that can be allowed to bypass the turbo-compressor is determined, with the remaining high pressure air sent to the turbine of the turbo-compressor. Using a first heat exchanger, heat is removed from the air bypassing the turbo-compressor and mixed with the air exiting the compressor side of the turbo-compressor to form a compressed air flow. In some instances, the compressed air flow may consist of only the air bypassing the turbo-compressor. The first heat exchanger can use the fan stream as a heat sink. An expanded air flow may be delivered from the turbine of the turbo-compressor to services on the aircraft, including one or more of an anti-icing system, a pneumatic supply system, and the like. Remove any excess heat from the airflow exiting the compressor using a second heat exchanger arranged between the compressor and the environmental control system or other end use. The second heat exchanger may use the fan stream or the expanded air flow as a heat sink. Optionally, some or all of the expanded airflow can be mixed with the compressed air flow prior to delivering the air to the ECS.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc., do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An engine bleed air system for an aircraft, comprising:
   one or more taps for extracting air from the compressor section of an engine;
   a turbo-compressor having a compressor and a turbine;
   an environmental control system fluidly connected to an outlet of the compressor by a delivery line;

a bypass line fluidly connecting at least one of the one or more taps to the delivery line such that fluid within the bypass line bypasses both the compressor and the turbine;

a bypass heat exchanger arranged to remove heat from the bypass line, an outlet of the bypass heat exchanger being directly connected to the delivery line such that the air provided at the outlet of the bypass heat exchanger is mixed with the air provided at the outlet of the compressor and with air provided from an outlet of the turbine within the delivery line, the air from the outlet of the bypass heat exchanger being mixed with the air from the outlet of the compressor at a location upstream from where the air from the outlet of the bypass heat exchanger mixes with the air from the outlet of the turbine; and a balancing heat exchanger located downstream from the turbo-compressor such that the balancing heat exchanger receives a first fluid directly from an outlet of the compressor via the delivery line and receives a second fluid from the outlet of the turbine, wherein the balancing heat exchanger uses the second fluid provided from the outlet of the turbine to remove heat from the first fluid from the delivery line.

2. The system of claim 1, wherein the one or more taps includes a low pressure tap and a high pressure tap, and wherein an inlet of the compressor is fluidly connected to the low pressure tap and an inlet of the turbine is fluidly connected to the high pressure tap.

3. The system of claim 1, wherein the bypass heat exchanger is arranged to utilize a fan stream as a heat sink.

4. The system of claim 1, wherein the balancing heat exchanger is arranged to utilize a fan stream as a heat sink.

5. The system of claim 1, wherein the balancing heat exchanger is arranged to utilize an expanded air flow from an outlet of the turbine as a heat sink.

6. The system of claim 1, wherein an expanded air flow exiting from an outlet of the turbine is fluidly connected to an aircraft service.

7. The system of claim 1, wherein an expanded air flow exiting from an outlet of the turbine is fluidly connected to the delivery line.

8. An engine bleed air system for an aircraft, comprising:

a plurality of taps for extracting air from the compressor section of an engine, the plurality of taps including a low pressure tap and a high pressure tap;

a turbo-compressor having a compressor and a turbine, an inlet of the compressor being fluidly connected to the low pressure tap and an inlet of the turbine being fluidly connected to the high pressure tap;

an environmental control system fluidly connected to an outlet of the compressor by a delivery line;

a balancing heat exchanger located downstream from the turbo-compressor such that air output from the compressor is provided directly to the balancing heat exchanger via the delivery line and at least a portion of air output from the turbine is provided to the balancing heat exchanger, wherein the balancing heat exchanger uses the portion of air output from the turbine to remove heat from the air output from the compressor; and a bypass heat exchanger disposed upstream of the turbo-compressor, wherein air output from the bypass heat exchanger bypasses both the compressor and the turbine and is mixed with the air provided at the outlet of the compressor and with air provided from an outlet of the turbine within the delivery line, the air from the outlet of the bypass heat exchanger being mixed with the air from the outlet of the compressor at a location upstream from where the air from the outlet of the bypass heat exchanger mixes with the air from the outlet of the turbine.

9. The system of claim 8, wherein the balancing heat exchanger is arranged to utilize an expanded air flow from an outlet of the turbine as a heat sink.

10. The system of claim 8, further comprising:

a bypass line fluidly connecting the high pressure tap to the delivery line, the bypass heat exchanger being arranged to remove heat from the bypass line, the bypass heat exchanger arranged to utilize a fan stream as a heat sink.

* * * * *